United States Patent [19]

Carvalho

[11] Patent Number: 4,540,892

[45] Date of Patent: Sep. 10, 1985

[54] MULTIPLE INPUT VOLTAGE POWER CONTROLLER

[75] Inventor: John A. Carvalho, Arlington, Mass.

[73] Assignee: RCA Corporation, Princeton, N.J.

[21] Appl. No.: 563,608

[22] Filed: Dec. 20, 1983

[51] Int. Cl.³ .............................................. H02M 1/10
[52] U.S. Cl. ................................ 307/130; 307/132 E; 307/140; 363/142
[58] Field of Search .............. 307/116, 125, 126, 127, 307/130, 132 E, 140; 340/660, 661; 361/187; 323/299–303; 363/142, 143

[56] References Cited

U.S. PATENT DOCUMENTS

| | | | |
|---|---|---|---|
| 2,767,369 | 10/1956 | Schindler | 307/130 X |
| 2,830,253 | 4/1958 | Sleeper, Jr. | 323/301 |
| 3,130,328 | 4/1964 | Moore | 307/130 |
| 3,249,929 | 5/1966 | Sillers, Jr. | 340/663 |
| 3,836,854 | 9/1974 | Wehman | 324/133 |
| 4,238,811 | 12/1980 | Fry | 361/92 |
| 4,415,964 | 11/1983 | Scharfe, Jr. | 363/142 |

Primary Examiner—A. D. Pellinen
Assistant Examiner—Derek S. Jennings
Attorney, Agent, or Firm—Joseph S. Tripoli; Robert L. Troike; Raymond E. Smiley

[57] ABSTRACT

A power controller determines which of a plurality of possible input voltages is present and configures a load to operate at that present input voltage.

5 Claims, 1 Drawing Figure

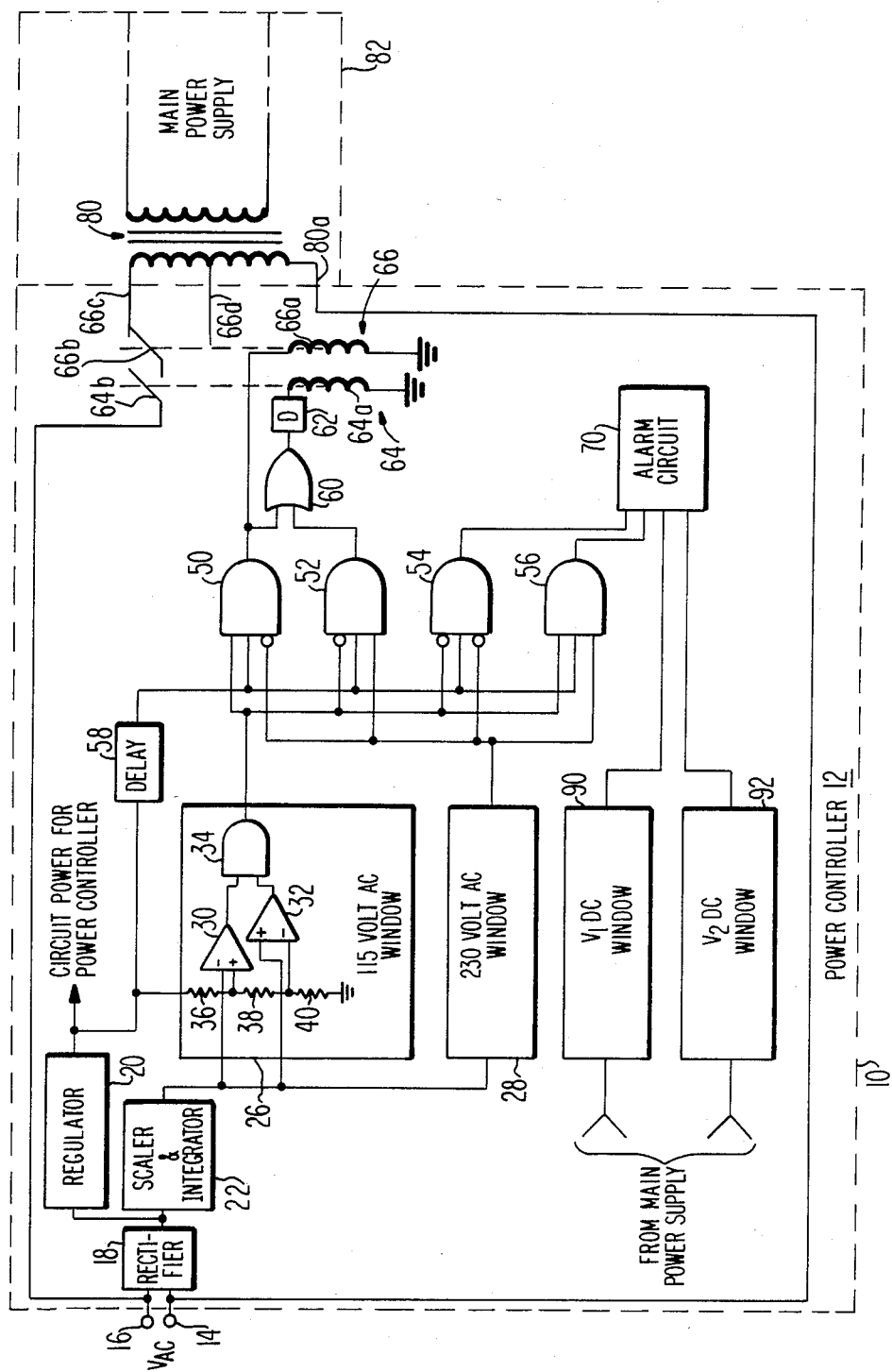

4,540,892

MULTIPLE INPUT VOLTAGE POWER CONTROLLER

The present invention relates to power controllers for connecting input power to a load only when the input power meets preselected criteria and more particularly to such controllers where the connection between input and load is configured in dependence on the value of the input power.

BACKGROUND OF INVENTION

With equipment designed to work in many parts of the world there is often a problem of matching available power and particularly voltage levels to equipment needs. Thus in some instances 115 volts AC is the standard available voltage while in other locations 230 volts AC is the standard available voltage. Many pieces of equipment address the problem by having the capacity to operate with different voltages but require electrical jumper wires to be manually positioned in accordance with the available voltage.

Another approach to connecting either of two voltages to a load is to provide two equipment electrical plugs, one having prongs configured to plug into 115 volt outlet and one having prongs configured to plug into a 230 volt outlet. One of the two plugs is electrically connected directly to the equipment while the other is connected to an auto transformer or similar device to alter the input voltage to the other of the two voltages. The output of the auto-transformer is then connected to the equipment which is therefore configured to operate at only one of the two possible input voltages.

The prior art approach of positioning jumper wires is subject to operator error in that if 230 volts is supplied and the equipment is configured to operate at 115 volts considerable damage can result. With the second approach, the autotransformer is of considerable weight, cost and size, and produces considerable heat which must be disapated by the equipment. Also with readily available plug adaptors it is still possible to insert the wrong plug into the wrong voltage outlet supply resulting in inoperative equipment or damage to the equipment.

SUMMARY OF THE INVENTION

In accordance with a preferred embodiment of the present invention a power controller for determining which of a plurality N N>1) of different possible power levels is present and for configuring a load to accept the present power level, comprises in combination N means each responsive to the power level being within a range about a different associated one of N power levels for producing an output signal of one value and responsive to the associated one of N power levels being without the range for producing an output signal of another value. The controller further comprises means responsive to the output signals of the N means, for configuring the load to accept the present power level.

BRIEF DESCRIPTION OF THE DRAWING

The sole FIGURE is a power controller in electrical block and logic schematic form in accordance with a preferred embodiment of the present invention.

DETAILED DESCRIPTION

Referring to the sole figure, dashed block 10 surrounds a power controller 12 which is receptive of alternating current input voltage at terminals 14 and 16. Any of a plurality N of voltages may be available but for purposes of discussion the input voltage at terminals 14 and 16 will be assumed to be one of two values, either 115 volts AC or 230 volts AC. Thus in the exemplary embodiment N is 2. Terminals 14 and 16 are connected to a rectifier 18 which produces a DC voltage corresponding to the input voltage at terminals 14 and 16. The output of rectifier 18 is connected to a regulator 20 and to a scaler and integrator circuit 22.

The purpose of scaler and integrator circuit 22 is to alter the value of the DC voltage produced by rectifier 18, typically downward, to a few volts, and to smooth the rectified voltage to produce more stable DC voltage at the output of scaler and integrator circuit 22.

The purpose of regulator 20 is to provide DC power to operate the various components of the power controller 12 within block 10.

The output of scaler and integrator circuit 22 is connected to a plurality of window circuits equal in number to the number N of distinct voltages that may be applied to input terminals 14 and 16. Two window circuits 26 and 28 detect the presence at terminals 14 and 16 of 115 volts AC and 230 volts AC respectively. Window circuit 26 is comprised of two operational amplifiers, (hereinafter "op-amps") 30 and 32, the outputs of which are connected to respective inputs of an AND gate 34. The inverting (minus) input of op-amp 30 and the non-inverting (plus) input of op-amp 32 are connected to the output of scaler and integrator circuit 22. The non-inverting input of op-amp 30 and the inverting input of op-amp 32 are connected to a ladder voltage divider network comprising resistors 36, 38 and 40. The ladder network is connected in series between regulator 20 and power controller ground.

The value of ladder network resistors 36, 38 and 40 are chosen such that when the output of scaler and integrator 22 is within some DC voltage range corresponding to 115 volts AC plus or minus some preselected upper and lower deviation, both op-amps 30 and 32 produce logic one output signals which enable AND gate 34 to produce a logic one signal. If the voltage produced by circuit 22 is either too high, that is above a range which corresponds to an acceptable value above 115 volts, or is too low, one or the other of op-amps 30 and 32 produces a logic zero output voltage which disables AND gate 34 causing it therefore to produce a logic zero output. Window detector 28 for detecting 230 volts AC is identical to window detector 26 except that the resistor ladder which is connected to regulator 20 is comprised of different value resistors to cause window detector 28 to operate with an input voltage of 230 volts plus or minus any accepted deviation therefrom.

If more than two voltages can possibly be applied at terminals 14 and 16, additional window detectors are utilized which are identical to window detector 26 except again for differing values of resistors 36, 38 and 40. The output of window detector 26 and more particularly the output of AND gate 34 thereof is coupled to one input of each of AND gates 50 and 56 and to an inverting input of AND gates 52 and 54. (An Inverting input of an AND gate is illustrated with a small circle.)

The output of 230 volt AC window detector 28 is connected to second inputs of AND gates 52 and 56 and to inverting inputs of AND gates 50 and 54. The output of regulator 20 is passed through a delay 58 to a third input of each of AND gates 50, 52, 54 and 56. The signal from delay 58 is for the purpose of priming each of the AND gates 50, 52, 54 and 56. The delay 58 is introduced so that, in a manner to be described hereinafter, window detectors 26 and 28 have sufficient time to stabilize after power is applied to terminals 14 and 16 before any of the AND gates is enabled.

The outputs of each of AND gates 50 and 52 is connected to a respective input of OR gate 60. The output of OR gate 60 is coupled to a delay 62 which is, in turn, connected to the coil 64a of a relay 64. The output of AND gate 50 is connected to the coil 66a of a second relay 66. The outputs of AND gates 54 and 56 are connected to respective inputs of an alarm circuit 70. Power applied at input terminal 16 is connected through normally open relay arm 64b of relay 64 and through arm 66b and contact 66c or 66b and 66d of relay 66 to respective inputs of winding 80a of a main power supply transformer 80. Main power supply transformer 80 is part of a load (the remainder not being shown) within dashed block 82. The input winding 80a of transformer 80 is also connected to terminal 14.

Transformer 80 is part of a main power supply which is assumed to produce a number of DC voltages of various values for use by the load. Those various power supply voltages may also be connected to window circuits such as 90 and 92 which may be identical in design to window circuit 26. The output of those window circuits is connected to alarm circuit 70.

Operation of the power controller circuit is as follows:

Terminals 14 and 16 are connected to a source of AC power which is initially of unknown value but will be assumed for purposes of description to be 115 volts AC plus or minus 15 volts AC. This input signal is rectified by rectifier 18 to a DC voltage containing ripple. The output signal emitted from rectifier 18 is scaled to reduce it in value to a small voltage, for example, on the order of a few volts, and integrated to eliminate the ripple of the signal as produced by rectifier 18. Resistors 36, 38 and 40 are of values set such that, if the voltage at terminals 14 and 16 is below 130 volts op-amp 30 produces a logic one signal and if the voltage is above 100 volts op-amp 32 also produces a logic one signal. Therefore, AND gate 34 produces a logic one signal which is applied to AND gates 50 and 56 to prime those gates. The logic one is inverted at the input of AND gate 54 to disable that AND gate.

Simultaneously, the voltage from scaler and integrator circuit 22 is applied to window circuit 28. Because of the difference in value of voltage dividers, the equivalent of op-amp 30 will be at a logic one and the equivalent of op-amp 32 will be at a logic zero. Therefore, the output of the equivalent of AND gate 34 is a logic zero. The logic zero signal keeps AND gates 52 and 56 disabled and is inverted at the input of AND gate 50 to prime AND gate 50 also primed by the logic one output of detector 26.

The signal produced by rectifier 18 is applied to regulator 20 causing it to produce output voltages to operate power controller 12 and in particular produces a signal which after a delay caused by delay 58, 0.5 seconds being exemplary, attempts to enable all of AND gates 50, 52, 54 and 56. With the assumed condition, 115 volts AC ±15 volts present between terminals 14 and 16, only AND gate 50 is enabled. AND gate 52 is disabled because of the logic zero from window detector 28.

AND gate 54 would be enabled only if window detectors 26 and 28 were both producing a logic zero indicating that some voltage outside of the range of voltages around 115 volts and outside of the range of voltages around 230 volts were being applied between terminals 14 and 16. In fact, the logic one signal produced by detector 26 and inverted to a logic zero at the input of AND gate 54 keeps that gate disabled.

AND gate 56 would be enabled only if logic one signals were being simultaneously produced by detectors 26 and 28. This condition indicates that seemingly both 115 volts and 230 volts are simultaneously present between the input terminals 14 and 16 which cannot, of course, occur with properly working equipment.

Assuming for a moment that one or the other or both of AND gates 54 and 56 were to be enabled the resulting logic one signals would activate alarm circuit 70 which could be set to produce an audible and/or visual alarm.

Returning to the situation in which 115 volts is present between input terminals 14 and 16, when AND gate 50 is enabled to produce a logic one signal, the logic one signal enables coil 66a of relay 66 causing arm 66b to move from the position illustrated, that is, against contact 66c, which is the normal position of arm 66b when coil 66a is deenergized, to the other position, that is, against contact 66d.

The logic one signal from AND gate 50 also enables OR gate 60 causing a logic one signal to be applied to delay 62. After a brief delay occasioned by delay 62 (a delay of 0.5 seconds being exemplary), coil 64a of relay 64 is energized causing arm 64b to close. The result is that 115 volts plus or minus 15 volts AC passes through winding 80a of main power supply transformer 80 causing it to operate in the desired manner.

Operation when 230 volts is applied between terminals 14 and 16 is as above described except as follows:

Window detector 26 produces a logic zero output causing AND gate 50 to produce a logic zero output. Window detector 28 produces a logic one ouput. Therefore, after the delay occasioned by delay 58 AND gate 52 is enabled which casues OR gate 60 to be enabled. Therefore, after the delay occasioned by delay 62, coil 64a of relay 64 is energized causing the closure of arm 64b thereof. Because AND gate 50 is producing a logic zero, relay 66 is disabled resulting in arm 66b contacting contact 66c. Therefore 230 volts is applied through arm 66b and contact 66c to the full winding 80a of main power supply transformer 80. Again because the voltage is applied between the proper portion of winding 80a of main power supply transformer 80, the main power supply produces the proper output voltages. If other voltages are possible, winding 80a would have to have additional windings and additionally relays other than relay 66 would need to be provided to connect the input power through two or more relay contacts to the proper winding of transformer 80.

Once the main power supply is producing its proper output voltages, and after a suitable delay if the desired output voltages are not present, signals indicating such will be sent from window circuits 90 or 92 and any other neccessary window circuits to alarm circuit 70 causing a suitable audible or visual alarm to be generated.

What is claimed is:

1. A power controller for determining which of a plurality N (N greater than 1) of different possible input power levels is present and for configuring a load to accept the present power level, comprising in combination:
   N means, each responsive to said power level being within a range about a different associated one of N power levels for producing an output signal of one value and for otherwise producing said output signal of another value; and
   means responsive to the output signals from said N means for configuring said load to accept said present power level.

2. The combination as set forth in claim 1 wherein said each of said N means comprises means for producing said one value of output signal when said input voltage is between a preselected upper voltage threshold and a preselected lower voltage threshold corresponding to a desired range about an associated one of said N power levels, the upper and lower thresholds for each of said N means defining mutually exclusive voltage ranges.

3. The combination as set forth in claim 1 wherein said means responsive to said N means comprises means producing a distinctive signal corresponding to whichever one of said N means is producing said one value of output signal, so long as only one of said N means is producing said one value of output signal and otherwise producing an error signal, said distinctive signal being utilized to configure said load to operate at the present input voltage.

4. The combination as set forth in claim 3 wherein said load comprises a multi-tap transformer, and wherein the means for configuring said load comprises means for connecting said input voltage to the correct tap of said multi-tap transformer in correspondence to the value of input voltage.

5. The combination as set forth in claim 1 wherein said input power is of the alternating current type and further including means for producing a direct current voltage of a value which corresponds to the value of the input power and wherein said N means are receptive of said direct current voltage.

* * * * *